United States Patent
Kim et al.

(10) Patent No.: US 9,326,281 B2
(45) Date of Patent: Apr. 26, 2016

(54) METHOD AND APPARATUS FOR COMMUNICATING BY USING DIFFERENT TYPES OF CARRIERS IN RADIO COMMUNICATION SYSTEM SUPPORTING CARRIER AGGREGATION

(71) Applicant: LG ELECTRONICS INC., Seoul (KR)

(72) Inventors: Bonghoe Kim, Anyang-si (KR); Dongyoun Seo, Anyang-si (KR); Suckchel Yang, Anyang-si (KR); Joonkui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 60 days.

(21) Appl. No.: 14/380,664

(22) PCT Filed: Feb. 28, 2013

(86) PCT No.: PCT/KR2013/001635
§ 371 (c)(1),
(2) Date: Aug. 22, 2014

(87) PCT Pub. No.: WO2013/129865
PCT Pub. Date: Sep. 6, 2013

(65) Prior Publication Data
US 2015/0049687 A1 Feb. 19, 2015

Related U.S. Application Data

(60) Provisional application No. 61/603,962, filed on Feb. 28, 2012, provisional application No. 61/612,414, filed on Mar. 19, 2012, provisional application No. 61/612,971, filed on Mar. 19, 2012, provisional application No. 61/615,349, filed on Mar. 26, 2012.

(51) Int. Cl.
*H04W 72/04* (2009.01)
*H04L 5/00* (2006.01)

(52) U.S. Cl.
CPC ............. *H04W 72/042* (2013.01); *H04L 5/001* (2013.01); *H04L 5/0035* (2013.01); *H04L 5/0048* (2013.01); *H04L 5/0023* (2013.01); *H04L 5/0073* (2013.01); *H04L 5/0098* (2013.01)

(58) Field of Classification Search
CPC .................................................. H04W 72/042
USPC .................. 370/204–215, 252, 310–337
See application file for complete search history.

(56) References Cited

U.S. PATENT DOCUMENTS 8,958,409 B2 * 2/2015 Han ........................... 370/343
2009/0219910 A1 * 9/2009 Han .................... H04L 27/2614
370/343

(Continued)

OTHER PUBLICATIONS

PCT International Application No. PCT/KR2013/001635, Written Opinion of the International Searching Authority dated May 30, 2013, 1 page.

*Primary Examiner* — Andrew Lai
*Assistant Examiner* — Andrew C Lee
(74) *Attorney, Agent, or Firm* — Lee, Hong, Degerman, Kang & Waimey PC; Jonathan Kang; Justin Lee

(57) ABSTRACT

Provided through the present application are a method and an apparatus for use in a radio communication system, which supports carrier aggregation and carries out communication in subframe units. More specifically, user equipment operating in a first type carrier for receiving from a base station, a first piece of control information, which is related to the first type carrier and a second type carrier that support the carrier aggregation, can measure a radio signal to carry out radio resource management with respect to the first type carrier by using a first reference signal, which is included in the first type carrier, and/or a second reference signal, which is included in the second type carrier.

11 Claims, 13 Drawing Sheets

(56) References Cited

U.S. PATENT DOCUMENTS

| | | | |
|---|---|---|---|
| 2011/0199921 A1* | 8/2011 | Damnjanovic | H04W 52/367 370/252 |
| 2011/0261768 A1 | 10/2011 | Luo | |
| 2011/0280223 A1* | 11/2011 | Maeda | H04W 72/082 370/335 |
| 2012/0026977 A1 | 2/2012 | Kim et al. | |
| 2012/0033624 A1 | 2/2012 | Luo et al. | |
| 2012/0039330 A1 | 2/2012 | Baldemair et al. | |
| 2012/0040696 A1* | 2/2012 | Siomina | G01S 5/0036 455/456.6 |
| 2012/0044821 A1* | 2/2012 | Kim | H04L 5/001 370/252 |
| 2012/0076028 A1* | 3/2012 | Ko | H04L 1/0026 370/252 |
| 2012/0213143 A1* | 8/2012 | Zhang | H04L 5/001 370/312 |
| 2013/0039284 A1* | 2/2013 | Marinier | H04L 5/001 370/329 |

* cited by examiner

METHOD AND APPARATUS FOR COMMUNICATING BY USING DIFFERENT TYPES OF CARRIERS IN RADIO COMMUNICATION SYSTEM SUPPORTING CARRIER AGGREGATION

CROSS-REFERENCE TO RELATED APPLICATIONS

This application is the National Stage filing under 35 U.S.C. 371 of International Application No. PCT/KR2013/001635, filed on Feb. 28, 2013, which claims the benefit of U.S. Provisional Application Ser. Nos. 61/603,962, filed on Feb. 28, 2012, 61/612,414, filed on Mar. 19, 2012, 61/612,971, filed on Mar. 19, 2012 and 61/615,349, filed on Mar. 26, 2012, the contents of which are all hereby incorporated by reference herein in their entirety.

BACKGROUND OF THE INVENTION

1. Field of the Invention

This specification relates to radio communication, and more particularly, to a method and apparatus for communication between a base station and a user equipment (UE) in a radio communication system which supports carrier aggregation (CA).

2. Related Art

One of requirements of a radio communication system is to support a high data transmission rate. To this end, various technologies such as a multiple input multiple output (MIMO), a cooperative multiple point transmission (COMP), a relay, and a carrier aggregation are being studied.

The carrier aggregation is a concept which bonds a plurality of bands as one system. In this case, each independently operable band may be called a component carrier (CC).

Further, the UE and the base station may perform communication by using various kinds of carriers (or cells). In the case of a general carrier which is used in a 3GPP LTE system, a cell specific reference signal (CRS) is used through all subframes, and a synchronization signal (SS) is included in some of the subframes. Further, a physical downlink control channel (PDCCH) is included in each subframe.

SUMMARY OF THE INVENTION

An object of the present invention is to suggest a new type of carrier in a radio communication system which supports carrier aggregation, and provide a method and apparatus for communication between a user equipment (UE) and a base station.

The present specification suggests a method and apparatus which supports carrier aggregation and is used in a radio communication system which performs communication in subframe units.

Specifically, in the scheme according to the present specification, a first piece of control information related to a first type carrier and a second type carrier which support the carrier aggregation is received from a base station.

Additionally or alternatively, the UE, which operates in the first type carrier, may measure a radio signal by using at least one of a first reference signal included in the first type carrier and a second reference signal included in the second type carrier in order to perform radio resource management for the first type carrier.

Additionally or alternatively, a synchronization signal is not included in the first type carrier.

Additionally or alternatively, the UE, which operates in the first type carrier, maintains synchronization for the first type carrier by using a synchronization signal which is included in the second type carrier.

Additionally or alternatively, the first reference signal is at least one of a channel state information reference signal (CSI-RS) related with the first type carrier and a cell specific reference signal (CRS).

Additionally or alternatively, the second reference signal is at least one of a channel state information reference signal (CSI-RS) related with the second type carrier and a cell specific reference signal (CRS).

Additionally or alternatively, the cell specific reference signal (CRS) is included in only some of all subframes in the first type carrier.

Additionally or alternatively, the first type carrier is a synchronized carrier and the second type carrier is a synchronization reference carrier.

Additionally or alternatively, the synchronization signal includes a primary synchronization signal (PSS) and a secondary synchronization signal (SSS).

Additionally or alternatively, a physical downlink control channel (PDCCH) is not included in the first type carrier.

Additionally or alternatively, the PDCCH and the cell specific reference signal are included in all subframes in the second type carrier.

The present specification suggests a specific first type carrier and a measurement scheme and synchronization criteria for the first type carrier. The first type carrier may be related to a new carrier type (NCT) or may be a synchronized carrier related to the synchronization reference carrier.

The communication between the UE and the base station may be efficiently performed through the carrier which is suggested in the present specification.

DESCRIPTION OF EXEMPLARY EMBODIMENTS

The present invention provides a method and apparatus for transmitting control information in a wireless communication system, which supports carrier aggregation (CA) in the wireless communication system. For clarifying the description, the present invention will be described based on 3GPP LTE supporting the carrier aggregation (CA) and an evolution thereof, but is not limited thereto.

Long term evolution (LTE) for a 3rd generation partnership project (3GPP) standard organization, as a part of evolved-UMTS (E-UMTS) using an evolved-universal terrestrial radio access network (E-UTRAN), adopts orthogonal frequency division multiple access (OFDMA) in a downlink, and adopts single carrier-frequency division multiple access (SC-FDMA) in a uplink. LTE-A (advanced) is an evolution of the LTE.

Figure 1:
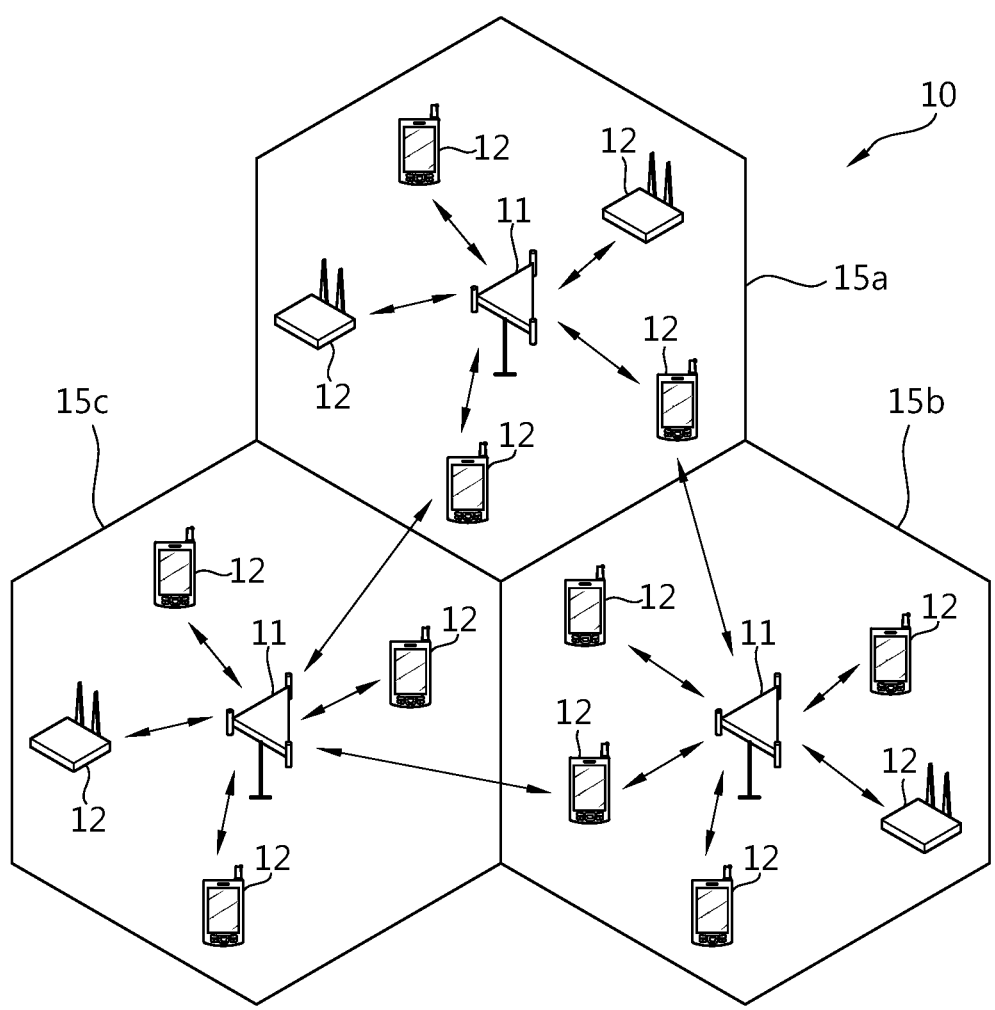
FIG. 1 shows a radio communication system.

FIG. 1 shows a wireless communication system.

Referring to FIG. 1, the wireless communication system 10 includes one or more Base Stations (BSs) 11. The BSs 11 provide communication services to specific geographical areas 15 commonly called cells. Each of the cells may be divided into a plurality of areas, and each of the areas is called a sector. One BS may include one or more cells. In general, the BS 11 refers to a fixed station that communicates with UEs 13, and it may also be called another terminology, such as an evolved NodeB (eNB), a Base Transceiver System (BTS), an access point, or an Access Network (AN).

The User Equipment (UE) 12 may be fixed or mobile and may also be called another terminology, such as a Mobile Station (MS), a User Terminal (UT), a Subscriber Station (SS), a wireless device, a Personal Digital Assistant (PDA), a wireless modem, a handheld device, or an Access Terminal (AT).

Hereinafter, downlink (DL) refers to communication from the BS 11 to the UE 12, and uplink (UL) refers to communication from the UE 12 to the BS 11.

The wireless communication system 10 may be a system which supports bidirectional communication. Bidirectional communication can be performed using Time Division Duplex (TDD) mode, Frequency Division Duplex (FDD) mode or the like. TDD mode uses different time resources in UL transmission and DL transmission. FDD mode uses different frequency resources in UL transmission and DL transmission. The BS 11 and the UE 12 communicate with each other using radio resources called radio frames.

Figure 2:
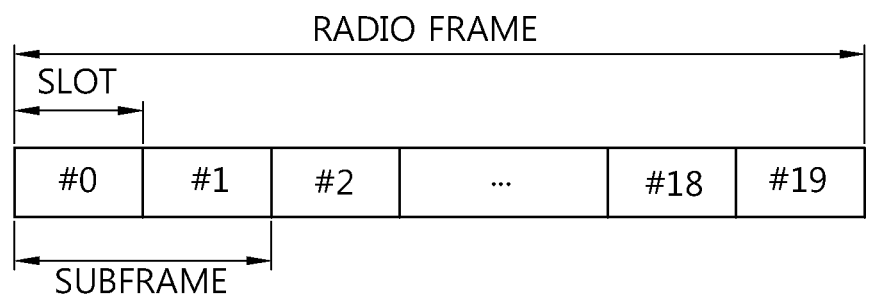
FIG. 2 shows a radio frame structure.

FIG. 2 shows the structure of a radio frame.

Referring to FIG. 2, the radio frame includes 10 subframes, and one subframe includes two slots. The length of one subframe may be 1 ms, and the length of one slot may be 0.5 ms. The time that it takes to transmit one subframe is called a Transmission Time Interval (TTI). The TTI may be a minimum scheduling unit.

One slot may include a plurality of Orthogonal Frequency Division Multiplexing (OFDM) symbols in the time domain. The OFDM symbol is used to represent one symbol period because 3GPP LTE uses OFDMA in downlink and may be called another terminology according to a multiple access scheme. For example, if SC-FDMA is used as an uplink multiple access scheme, corresponding symbols may be called SC-FDMA symbols. One slot is illustrated as including 7 OFDM symbols, but the number of OFDM symbols included in one slot may be changed depending on the length of a Cyclic Prefix (CP). In accordance with 3GPP TS 36.211 V8.5.0 (2008-12), 1 subframe includes 7 OFDM symbols in a normal CP, and 1 subframe includes 6 OFDM symbols in an extended CP. The structure of the radio frame is only an example, and the number of subframes included in the radio frame and the number of slots included in the subframe may be changed in various ways.

Figure 3:
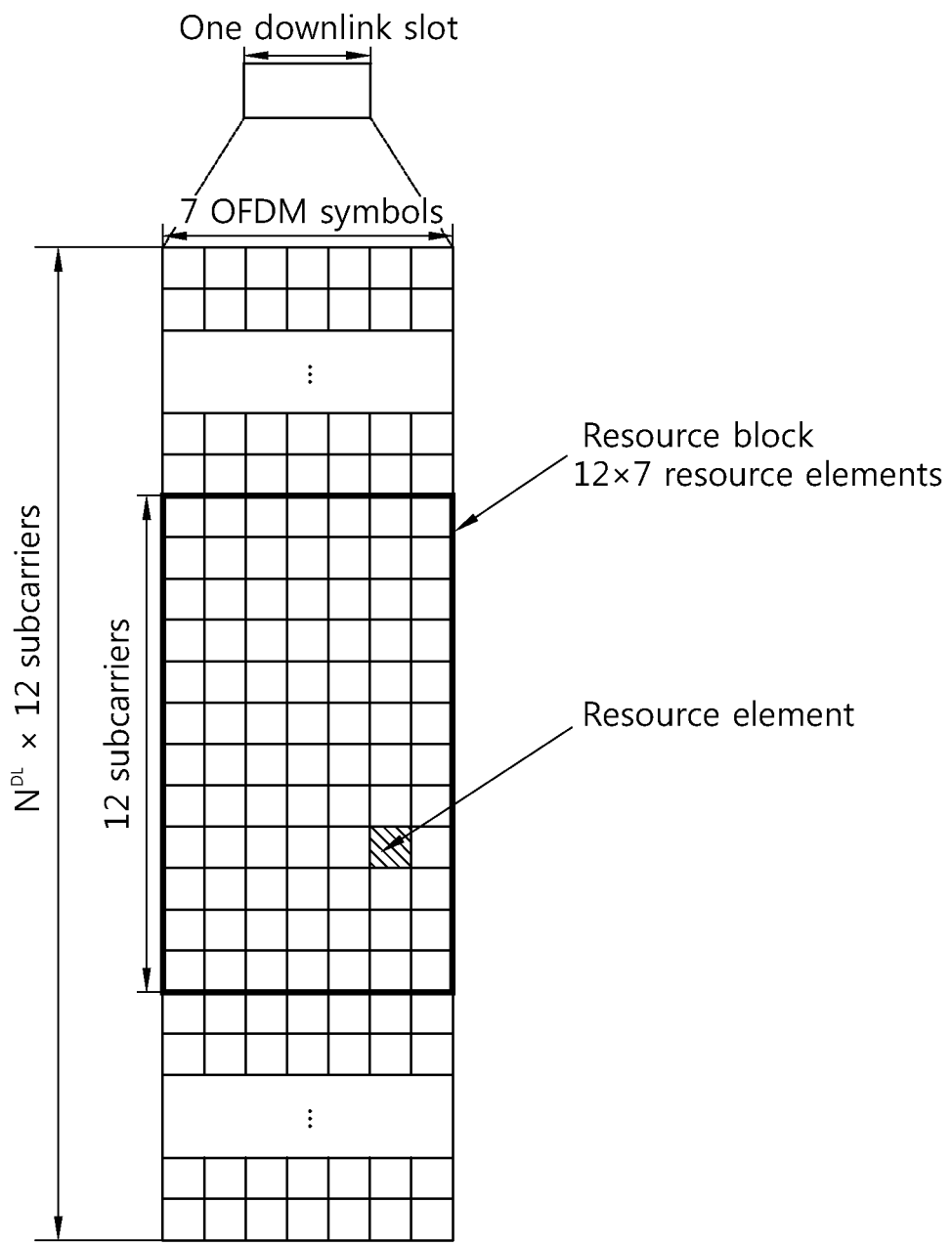
FIG. 3 shows an example of a resource grid for one downlink slot.

FIG. 3 shows an example of a resource grid for one downlink slot.

Referring to FIG. 3, the downlink slot includes a plurality of OFDM symbols in the time domain and includes NRB Resource Blocks (RBs) in the frequency domain. The resource block is a resource allocation unit, and it includes one slot in the time domain and includes a plurality of contiguous subcarriers in the frequency domain.

The number of resource blocks NRB included in a downlink slot depends on a downlink transmission bandwidth configured in a cell. For example, in an LTE system, the number of resource blocks NRB may be any one of 6 to 110. An uplink slot may have the same structure as the downlink slot.

Each of elements on the resource grid is called a Resource Element (RE). The resource elements on the resource grid may be identified by an index pair (k, 1) within a slot. Here, k (k=0, . . . , NRB×12-1) indicates a subcarrier index in the frequency domain, and 1 (1=0, . . . , 6) indicates an OFDM symbol index in the time domain.

In FIG. 3, one resource block is illustrated as including 7×12 resource elements, including 7 OFDM symbols in the time domain and 12 subcarriers in the frequency domain. However, the number of OFDM symbols and the number of subcarriers within a resource block are not limited thereto. The number of OFDM symbols and the number of subcarriers may be changed in various ways depending on the length of a CP, frequency spacing, etc. For example, the number of OFDM symbols is 7 in case of a normal CP, and the number of OFDM symbols is 6 in case of an extended CP. One of 128, 256, 512, 1024, 1536, and 2048 may be selected and used as the number of subcarriers in one OFDM symbol.

Figure 4:
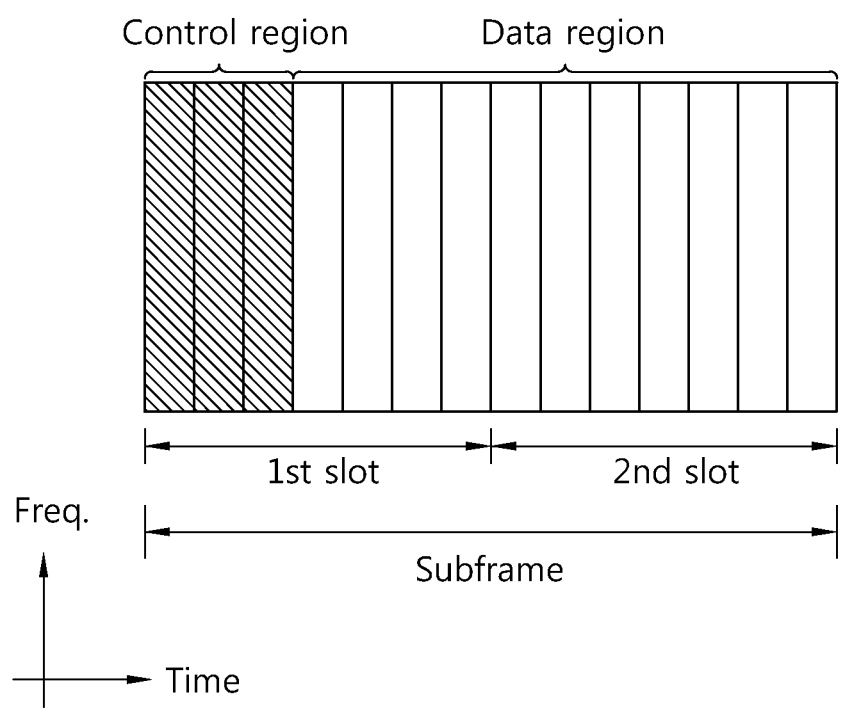
FIG. 4 shows an example of a downlink subframe structure in 3GPP LTE.

FIG. 4 shows an example of the structure of a downlink subframe in 3GPP LTE. The subframe includes two consecutive slots. A maximum of three former OFDM symbols of a first slot within the downlink subframe become a control region to which a physical downlink control channel (PDCCH) is allocated, and the remaining OFDM symbols become a data region to which physical downlink shared channels (PDSCHs) are allocated. Control channels, such as a physical control format indicator channel (PCFICH) and a physical hybrid ARQ indicator channel (PHICH), in addition to the PDCCH can be allocated to the control region. UE can read data information transmitted through the PDSCHs by decoding control information transmitted through the PDCCH. Here, the control region is illustrated as including the 3 OFDM symbols, but this is only illustrative. The PDCCH carries a downlink grant that informs the allocation of the resources of downlink transmission on the PDSCH. More particularly, the PDCCH can carry the allocation of the resources of the transport format of a downlink shared channel (DL-SCH), paging information on a paging channel (PCH), system information on a DL-SCH, the allocation of the resources of a higher layer control message, such as a random access response transmitted on a PDSCH, a transmission power control command, and the activation of a voice over IP (VoIP). Furthermore, the PDCCH carries an uplink grant that informs UE of the allocation of resources of uplink transmission. The number of OFDM symbols included in the control region within the subframe can be known by a PCFICH. The PHICH carries Hybrid Automatic Repeat reQuest (HARQ) acknowledgment (ACK)/negative-acknowledgement (NACK) signals in response to uplink transmission.

Figure 5:
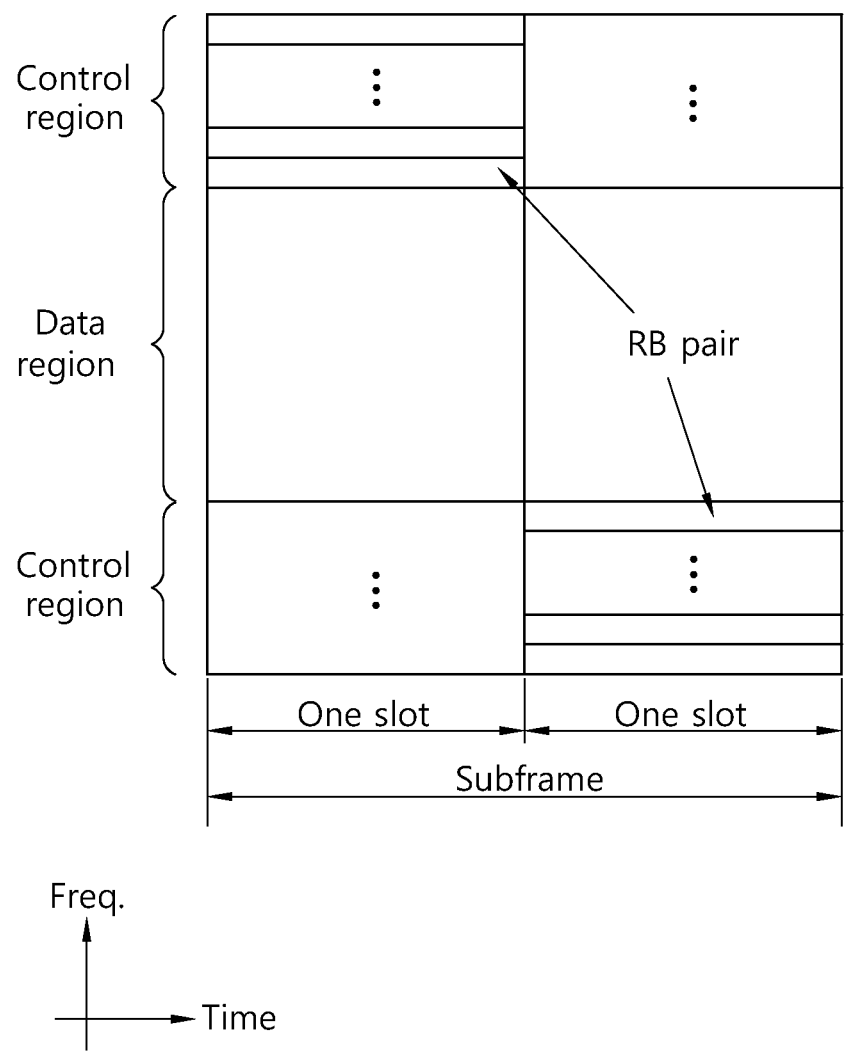
FIG. 5 shows the structure of a uplink subframe.

FIG. 5 shows the structure of an uplink subframe.

Referring to FIG. 5, the uplink subframe can be divided into a control region and a data region in the frequency domain. A physical uplink control channel (PUCCH) on which uplink control information is transmitted is allocated to the control region. A physical uplink shared channel (PUSCH) on which data (control information may also be transmitted according to circumstances) is transmitted is allocated to the data region. UE may transmit a PUCCH and a PUSCH at the same time or may transmit only one of a PUCCH and a PUSCH depending on a configuration.

A PUCCH for an MS is allocated in the form of a resource block pair (RB pair) in the subframe. Resource blocks that belong to the resource block pair occupy different subcarriers in a first slot and a second slot. A frequency that is occupied by the resource blocks belonging to the resource block pair to which a PUCCH is allocated is changed on the basis of a slot boundary. This is said that the RB pair allocated to the PUCCH has been subjected to frequency-hopped at the slot boundary. UE can obtain a frequency diversity gain by transmitting uplink control information through different subcarriers according to the time.

A Hybrid Automatic Repeat reQuest (HARQ) acknowledgement (ACK)/non-acknowledgement (NACK), and Channel Status Information (CSI) (e.g., a Channel Quality Indicator (CQI), a Precoding Matrix Index (PMI), a Precoding Type Indicator (PTI), and a Rank Indication (RI)) indicating a downlink channel state can be transmitted on the PUCCH.

The PUSCH is mapped to an UL-Uplink Shared Channel (SCH), that is, a transport channel. Uplink data transmitted on the PUSCH may be a transport block, that is, a data block for the UL-SCH transmitted during a TTI. The transport block may include user data. Or, the uplink data may be multiplexed data. The multiplexed data may be the multiplexing of the transport block for the UL-SCH and channel status information. For example, the channel status information multiplexed into the data may be a CQI, a PMI, or an RI. Or, the uplink data may include only the channel status information.

Hereinafter, the multiple carrier system will be described.

Figure 6:
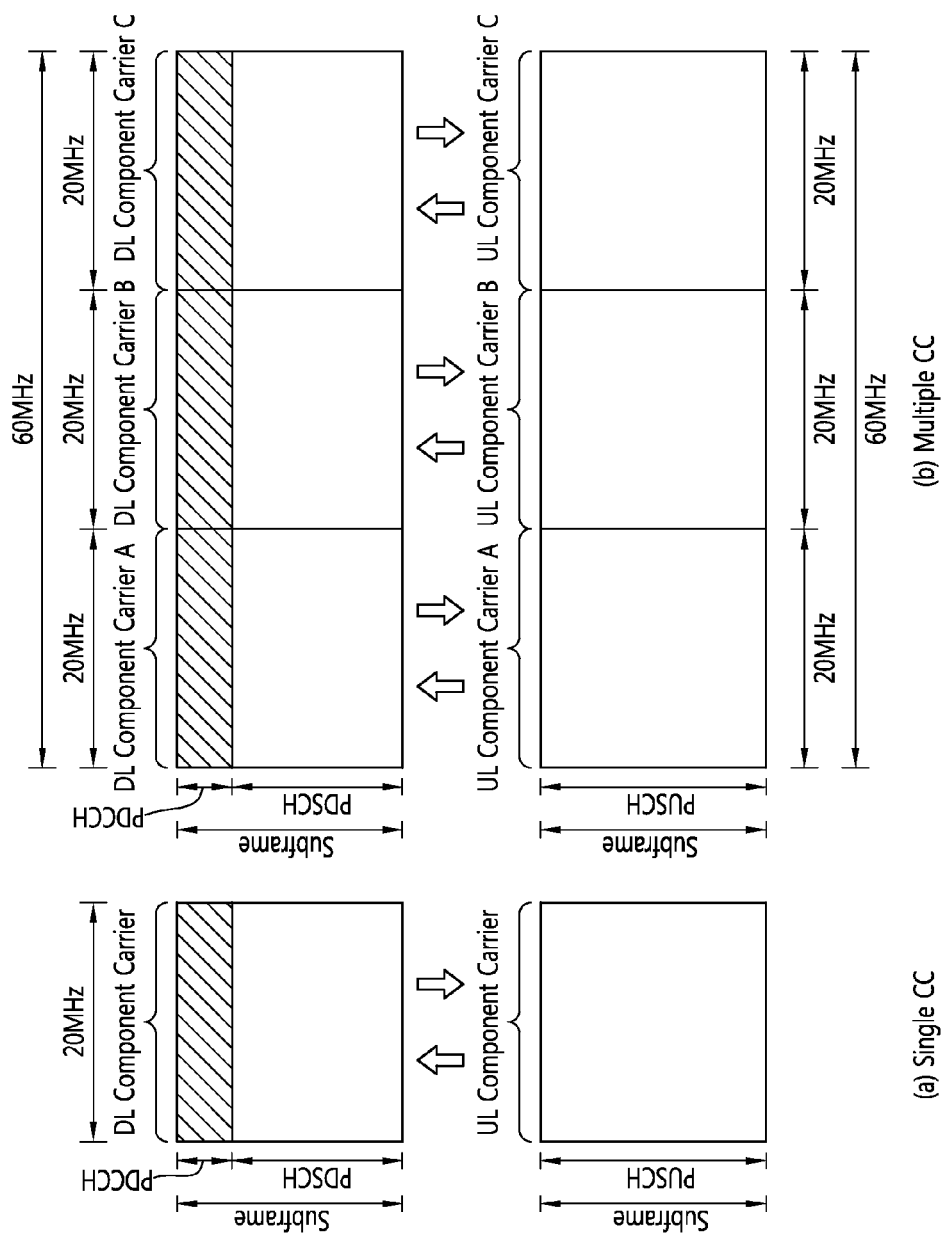
FIG. 6 shows an example of comparison between a single carrier system and a multiple carrier system.

FIG. 6 is an example of comparing a single carrier system with a multiple carrier system.

Referring to FIG. 6, the single carrier system supports only one carrier to the UE in the uplink and the downlink. A bandwidth of the carrier may be various, but the number of carriers allocated to the UE is one. On the contrary, in the multiple carrier system, a plurality of component carriers DL CCs A to C and UL CCs A to C may be allocated to the UE. For example, in order to allocate a bandwidth of 60 MHz to the UE, three 20-MHz component carriers may be allocated.

The multiple carrier system may be classified into a contiguous carrier aggregation system in which respective aggregated carriers are contiguous, and a non-contiguous carrier aggregation system in which the respective carriers are separated from each other. In this specification, the "multiple carrier system" includes both the case where the component carriers are contiguous and the component carriers are non-contiguous.

The component carrier targeted when one or more component carriers are collected may use the bandwidth used in an existing system for backward compatibility with the existing system as it is. For example, in a 3GPP LTE system, bandwidths of 1.4 MHz, 3 MHz, 5 MHz, 10 MHz, 15 MHz, and 20 MHz are supported, and in a 3GPP LTE-A system, a wide band of 20 MHz or more may be configured by using only the bandwidth of the 3GPP LTE system. Further, the wide band may be configured by defining a new bandwidth without using the bandwidth in the existing system as it is.

A system band of the wireless communication system is divided into a plurality of carrier-frequencies. Here, the carrier-frequency means a center frequency of a cell. Hereinafter, the cell may mean a downlink frequency resource and a uplink frequency resource. Further, the cell may mean a combination of the downlink frequency resource and an optional uplink frequency resource. Further, generally, in the case where the carrier aggregation (CA) is not considered, one cell may continuously exist as a pair of the uplink and downlink frequency resources. In order to transmit and receive packet data through a specific cell, first, the UE needs to complete a configuration for the specific cell. The configuration for the cell means a state in which reception of system information required for data transmission and reception for the corresponding cell is completed. For example, the configuration may include an entire process of receiving common physical layer parameters required for the data transmission and reception, MAC layer parameters, or parameters required for a specific operation in an RRC layer. The configured cell is in a state where transmission and reception of the packet are enabled immediately after only information that the packet data may be transmitted is received.

The configured cell may exist in an activation or deactivation state. Here, the activation means that the data is transmitted or received or in a ready state. The UE may monitor or receive a control channel PDCCH and a data channel PDSCH of the activated cell in order to verify a self-allocated resource (a frequency, a time, and the like).

The deactivation means that transmission or reception of the traffic data is impossible, and measurement or transmission/reception of minimum information is possible. The UE may receive system information (SI) required for receiving the packet from the deactivated cell. On the other hand, the UE does not monitor or receive a control channel PDCCH and a data channel PDSCH of the deactivated cell in order to verify the self-allocated resource (a frequency, a time, and the like).

The cell may be classified into a primary cell, a secondary cell, and a serving cell.

The primary cell means a cell operating in a primary frequency, and may mean a cell that performs an initial connection establishment procedure with the BS or a connection re-establishment process by the UE, or a cell indicated as the primary cell during a handover process. The secondary cell means a cell operating in a secondary frequency, and is first configured when RRC connection is established, and may be used to provide an additional radio resource.

The serving cell may be configured as the primary cell in the case of the UE in which the carrier aggregation (CA) is not configured or the CA may not be provided. In the case where the CA is configured, the term of the serving cell may be used to represent the primary cell and a set configured by one of all the secondary cells or a plurality of secondary cells. That is, the primary cell means one serving cell providing a security input and NAS mobility information, in an RRC establishment or re-establishment state. According to capabilities of the UE, at least one cell may be configured to form a serving cell set together with the primary cell, and the at least one cell is called the secondary cell. Accordingly, the set of the serving cells configured for one UE may be configured by only one primary cell, or by one primary cell and at least one secondary cell.

A primary component carrier (PCC) means a component carrier (CC) corresponding to the primary cell. The PCC is a CC in which the UE is early connected or RRC-connected with the BS, among many CCs. The PCC is a specific CC that performs connection or RRC-connection for signaling with respect to a plurality of CCs and manages UE context information which is connection information related to the UE. Further, the PCC is connected with the UE and continuously exists in the activation state in the case of an RRC connected mode.

A secondary component carrier means a CC corresponding to the secondary cell. That is, the SCC, as the CC allocated to the UE in addition to the PCC, is an extended carrier for additional resource allocation and the like of the UE in addition to the PCC, and may be divided into activation and deactivation states.

The downlink component carrier corresponding to the primary cell is called a downlink primary component carrier (DL PCC), and the uplink component carrier corresponding to the primary cell is called an uplink primary component carrier (UL PCC). Further, in the downlink, a component carrier corresponding to the secondary cell is called a DL secondary CC (DL SCC), and in the uplink, a component carrier corresponding to the secondary cell is called an uplink secondary CC (UL SCC).

The primary cell and the secondary cell may have the following characteristics.

First, the primary cell may be used for transmission of the PUCCH. Second, the primary cell is continuously activated, while the secondary cell may be a carrier activated/deactivated according to a specific condition. Third, when the primary cell experiences a radio link failure (RLF), the RRC re-establishment is triggered, but when the secondary cell experiences the RLF, the RRC re-establishment may not be triggered. Fourth, the primary cell may be changed by a security key or a handover procedure accompanied with a random access channel (RACH) procedure. Fifth, non-access stratum (NAS) information may be received through the primary cell. Sixth, the primary cell may be continuously configured by a pair of the DL PCC and the UL PCC. Seventh, a different component carrier (CC) for each UE may be configured as the primary cell. Eighth, procedures such as reconfiguration, adding, and removal of the primary cell may be performed by the RRC layer. In the addition of a new secondary cell, an RRC signaling to transmit system information of a dedicated secondary cell may be used.

The downlink component carrier may configure one serving cell, and the downlink component carrier and the uplink component carrier are connected to each other to configure one serving cell. However, the serving cell may not be configured by only one uplink component carrier. Activation/deactivation of the component carrier may be equal to a concept of the activation/deactivation of the serving cell. For example, if a serving cell 1 is configured by a DL CC1, the activation of the serving cell 1 may mean activation of the DL CC1. If a serving cell 2 is configured by connecting a DL CC2 and a UL CC2, the activation of the serving cell 2 may mean the activation of the DL CC2 and the UL CC2. In this regard, each component carrier may correspond to the cell.

The number of component carriers aggregated between the downlink and the uplink may be differently set. A case where the number of downlink CCs and the number of uplink CCs are the same as each other is called symmetric aggregation, and a case where the number of downlink CCs and the number of uplink CCs are different from each other is called asymmetric aggregation. Further, sizes (that is, bandwidths) of the CCs may be different from each other. For example, when five CCs are used for the configuration of a 70 MHz band, the five CCs may be configured as 5 MHz CC (carrier #0)+20 MHz CC (carrier #1)+20 MHz CC (carrier #2)+20 MHz CC (carrier #3)+5 MHz CC (carrier #4).

As described above, the multiple carrier system may support a plurality of component carriers (CCs) unlike the single carrier system. That is, one UE may receive a plurality of PDSCHs through a plurality of DL CCs.

Meanwhile, the multiple carrier system may support cross-carrier scheduling. The cross-carrier scheduling may be a scheduling method that may perform resource allocation of the PDSCH transmitted through other component carriers through the PDCCH transmitted through a specific component carrier and/or resource allocation of the PUSCH transmitted through other component carriers in addition to the component carrier which is basically linked with the specific component carrier. That is, the PDCCH and the PDSCH may be transmitted through different downlink CCs, and the PUSCH may be transmitted through another uplink CC which is not the uplink CC linked with the downlink CC transmitted by the PDCCH including a UL grant. As such, the system supporting the cross-carrier scheduling may need a carrier indicator indicating that the PDCCH notifies through which DL CC/UL CC the PDSCH/PUSCH providing control information is transmitted. A field including the carrier indicator may be hereinafter called a carrier indication field (CIF).

The multiple carrier system supporting the cross-carrier scheduling may include a carrier indication field (CIF) in an existing DCI format. In the system supporting the cross-carrier scheduling, for example, the LTE-A system, since the CIF is added to the existing DCI format (that is, the DCI format used in the LTE), 1 to 3 bits may be extended, and the PDCCH structure may reuse an existing coding method, a resource allocating method (that is, resource mapping based on the CCE), and the like.

Figure 7:
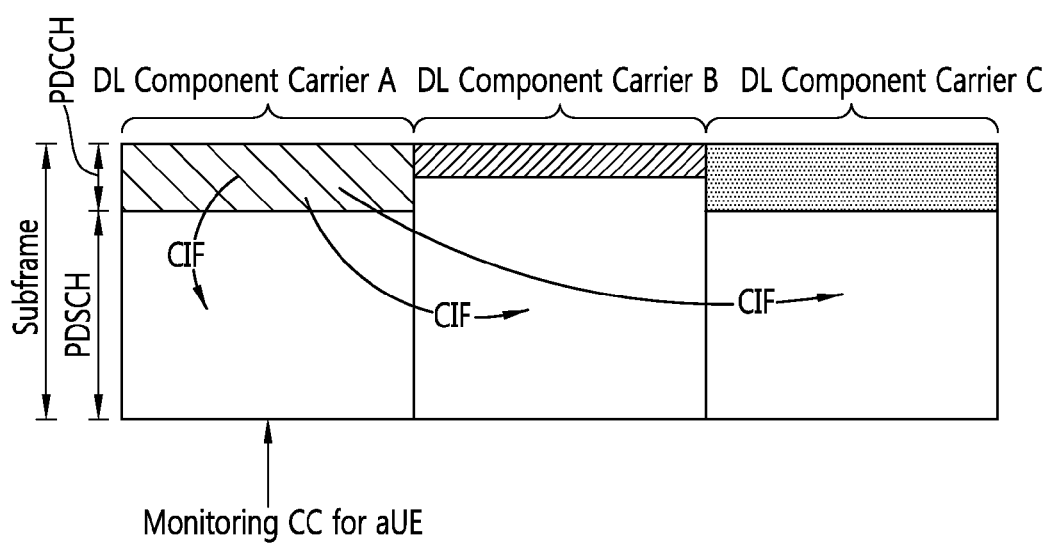
FIG. 7 shows an example of a subframe structure for cross-carrier scheduling in a multiple carrier system.

FIG. 7 illustrates an example of a subframe structure for cross-carrier scheduling in the multiple carrier system.

Referring to FIG. 7, the BS may set a PDCCH monitoring DL CC set. The PDCCH monitoring DL CC set is configured by some DL CCs among all the aggregated DL CCs, and when the cross-carrier scheduling is set, the UE may perform PDCCH monitoring/decoding with respect to only the DL CC included in the PDCCH monitoring DL CC set. In other words, the BS transmits the PDCCH for the PDSCH/PUSCH to be scheduled through only the DL CC included in the PDCCH monitoring DL CC set. The PDCCH monitoring DL CC set may be set UE-specifically, UE group-specifically, or cell-specifically.

FIG. 7 illustrates an example in which three DL CCs DL CC A, DL CC B, and DL CC C are aggregated and the DL CC A is set as the PDCCH monitoring DL CC. The UE may receive the DL grant for the PDSCH of the DL CC A, the DL CC B, and the DL CC C through the PDCCH of the DL CC A. The CIF is included in the DCI transmitted through the PDCCH of the DL CC A, and as a result, the CIF may indicate for which DL CC the corresponding DCI is a DCI.

A component carrier (CC) may be divided by cells. Hence, the CC and the cell may be expressed as the equivalent concept. In the present specification, each carrier (i.e., component carrier) and cell which support the carrier aggregation are explained with the equivalent concept.

In the present specification, a new type of carrier is suggested. Such a new type of carrier is related with the concept of a configured cell, an activated cell, and a deactivated cell. Hereinafter, the configured cell, the activated cell, and the deactivated cell will be described.

Figure 8:
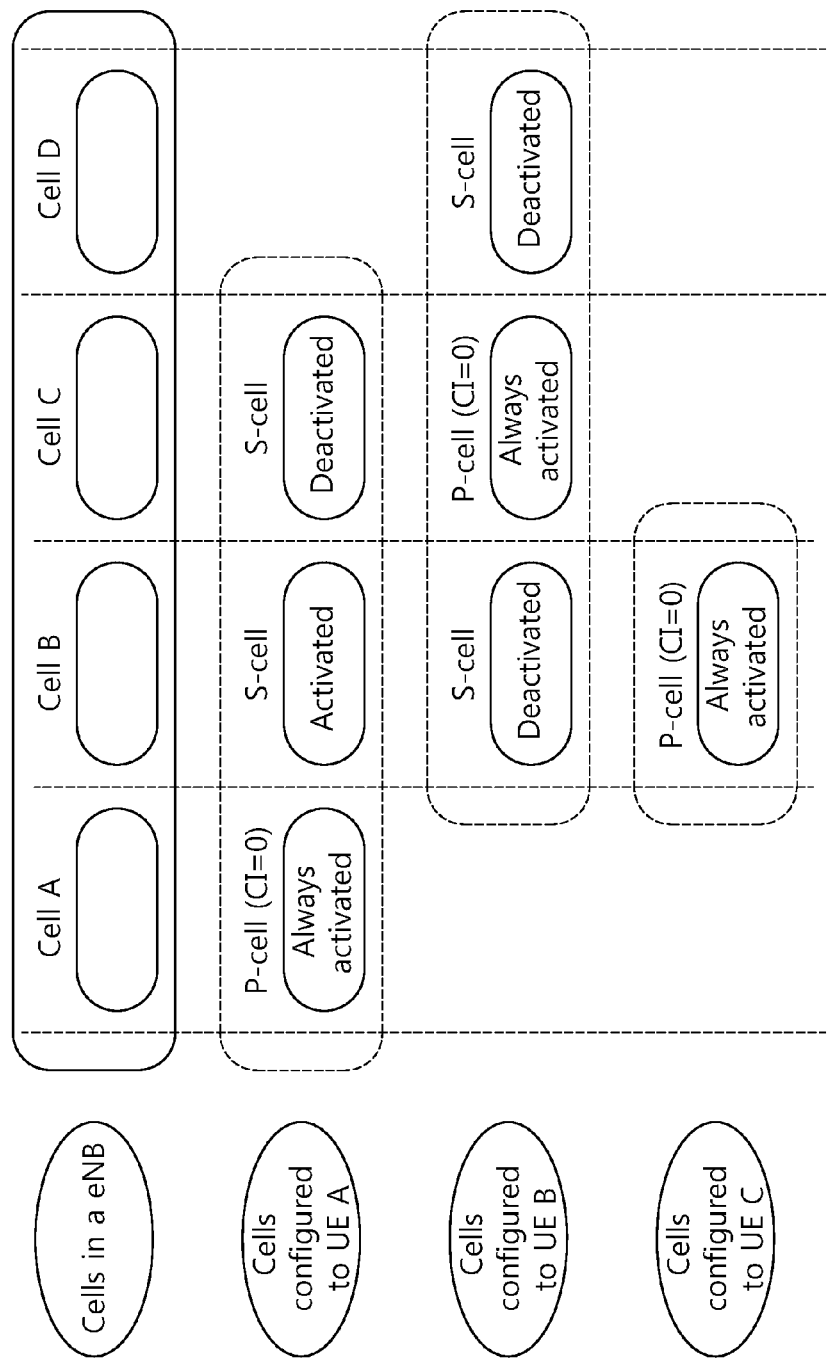
FIG. 8 shows the concept of a configured cell, an activated cell, and a deactivated cell.

FIG. 8 shows the concept of a configured cell, an activated cell, and a deactivated cell.

As illustrated in FIG. 6, configuration, activation, and deactivation may be performed for the cell. Specifically, the configured cell may be a cell which may perform carrier aggregation based on the measurement report. The measurement report may be measurement of the cell (i.e., carrier) by the UE. The configured cell is set for each UE. The configured cell may preserve in advance the resource for ACK/NACK transmission for PDSCH transmission.

The activated cell may be a cell which is set to actually transmit PDSCH/PUSCH from among the configured cells. CSI report and sounding reference signal (SRS) for PDSCH/PUSCH transmission may be performed.

The deactivated cell is a cell which is set not to transmit PDSCH/PUSCH by the command of the base station or the operation of the timer. In this case, CSI report and SRS may also be stopped.

The present specification suggests a new type carrier. Such a new type carrier is related to a synchronization signal (SS). Hereinafter, an example of the SS, which is used in the 3GPP LTE-A FDD system, will be described.

Figure 9:
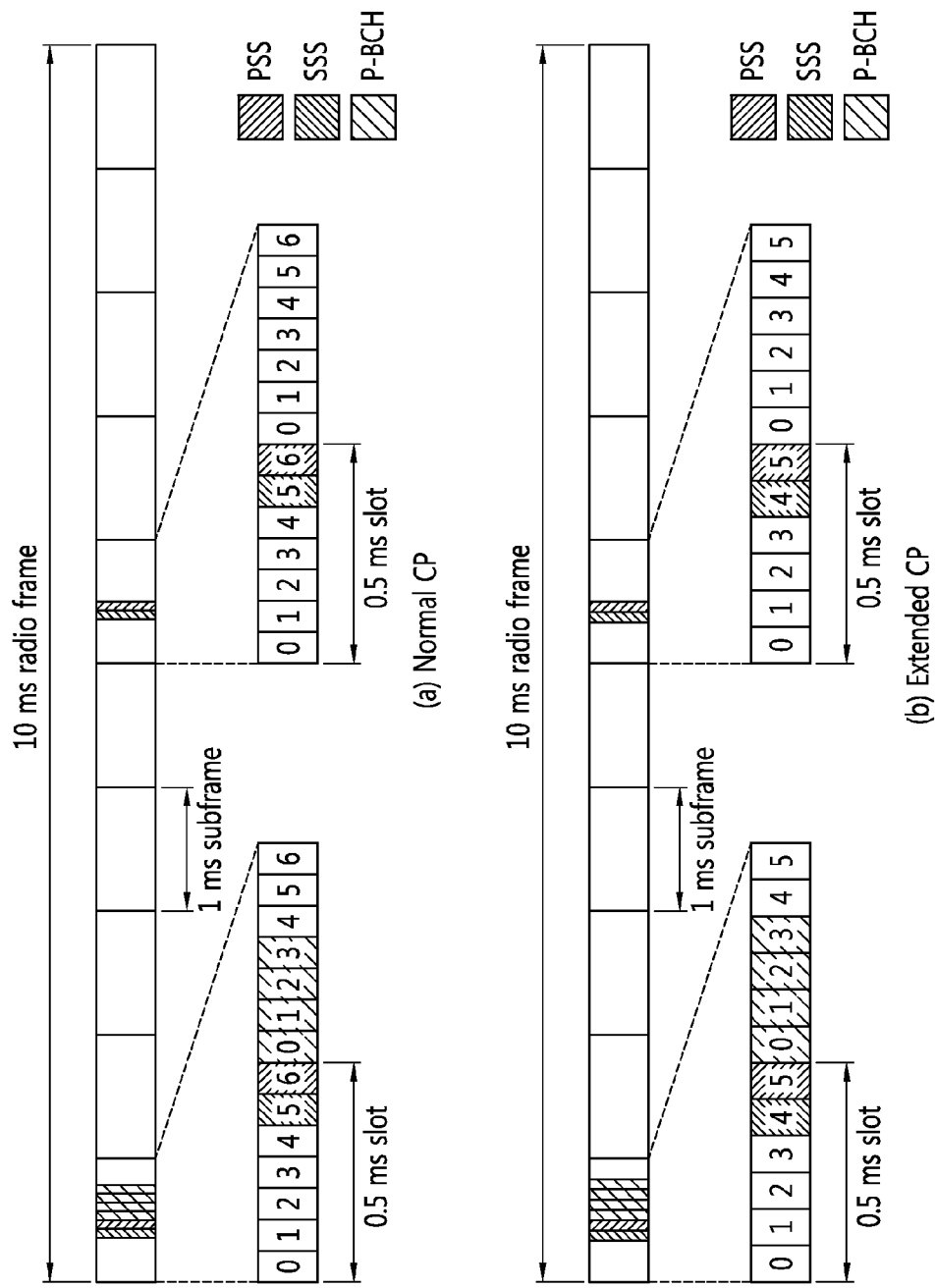
FIG. 9 shows an example of a synchronization signal which is used in a basic CP and an extended CP.

FIG. 9 shows an example of a synchronization signal which is used in a basic CP and an extended CP.

The synchronization signal may be divided into a primary SS (PSS) and a secondary SS (SSS) depending on the role and structure thereof. As illustrated in FIG. 9, when the basic CP and the extended CP are used, PSS/SSS is included in the preset subframe. Specifically, the synchronization signals (SS) are respectively transmitted from the second slots of subframe 0 and subframe 5 in consideration of the GSM frame length 4.6 ms, and the boundary for the radio frame may be detected through the SSS. The PSS is transmitted in the last OFDM symbol of the slot, and the SSS is transmitted in the OFDM symbol right before the PSS. The SS may transmit a total of 504 physical cell IDs through the combination of 3 PSSs and 168 SSSs. Further, the SS and the PBCH are transmitted within central 6 RBs within the system bandwidth so that the UE may be detected or decoded regardless of the transmission bandwidth.

The transmission diversity scheme of the SS uses only a single antenna port and is not separately defined in the standard. That is, a single antenna transmission or a UE-transparent transmission scheme (e.g., PVS, TSTD, CDD, etc.) may be used.

The detailed operation related with the PSS will be described below.

Zadoff-Chu (ZC) sequence of length 63 is defined in the frequency domain and is used as the sequence of the PSS. The ZC sequence is defined by formula 1 below, and the sequence element corresponding to the DC subcarrier, n=31, is punctured. In the formula 1 below, Nzc=63.

$$d\_u(n)=e^{\wedge}(-j\pi un(n+1)/N\_ZC)$$ [Formula 1]

9 remaining subcarriers among central 6RBs (=72 subcarriers) are always transmitted with the value 0 and make the filter design for synchronization easy. In order to define a total of 3 PSSs, in formula 1, u=25, 29, and 34 are used.

At this time, 29 and 34 have the conjugate symmetry relation and thus two correlations may be simultaneously performed. Here, the conjugate symmetry refers to the relation of formula 2 (the first formula is when Nzc is an even number, and the second formula is when Nzc is an odd number), and the one shot correlator for u=29 and 34 may be implemented by using this characteristic, and the overall amount of operations may be reduced by about 33.3%.

$$d_u(n)=(-1)^n(d_{N_{zc}-u}(n))^*$$

$$d_u(n)=(d_{N_{zc}-u}(n))^*$$ [Formula 2]

The detailed operation related with SSS will be described below.

Figure 10:
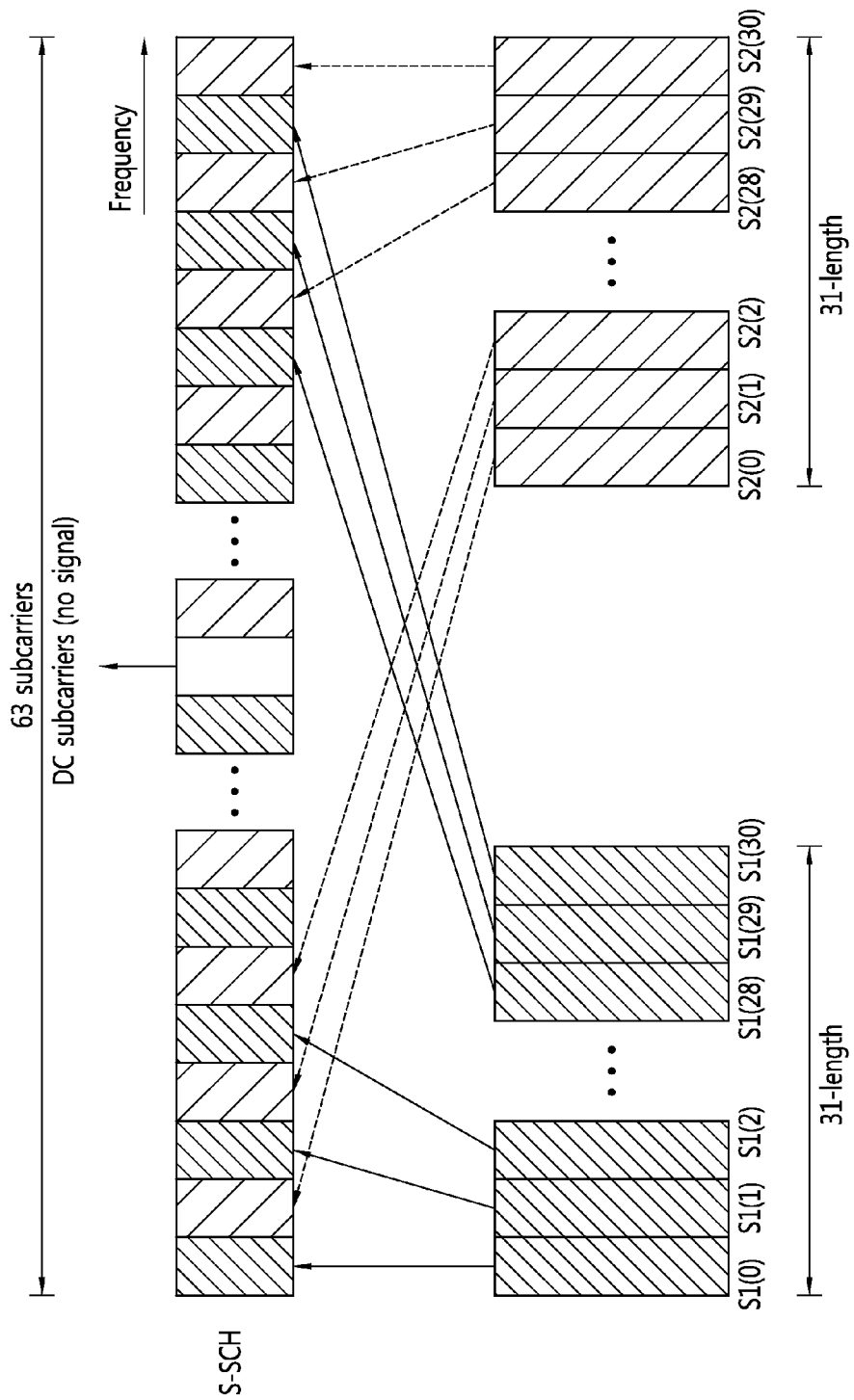
FIG. 10 shows a scheme of generating a code related to a sub-synchronous signal (SSS).

FIG. 10 shows a scheme of generating a code related to a sub-synchronous signal (SSS).

The sequence, which is used for SSS, performs interleaved joining of two m-sequences of length 31 and combines the two sequences so as to transmit 168 cell group ids. The m-sequence as the sequence of the SSS is strong in the frequency selective environment, and the amount of operations may be reduced by a high speed m-sequence conversion which uses the fast Hadamard transformation. Furthermore, configuring SSS with two short codes has been suggested to reduce the amount of operations of the UE.

FIG. 10 shows that two sequences in the logical region are interleaved in the physical region so as to be mapped. When two m-sequences, which are used for generation of SSS code, are defined as S1 and S2, if the SSS of subframe 0 transmits the cell group ID with (S1, S2) combination, SSS of subframe 5 swapped with (S2, S2) so as to be transmitted, and thus 10 ms frame boundary may be distinguished. At this time, the used SSS code uses a polynomial of $x^5+x^2+1$, and may generate a total of 31 codes through different circular shifts.

In order to enhance the receiving performance, the PSS-based two different sequences are defined so as to be scrambled to the SSS and are scrambled to different sequences to S1 and S2. Thereafter, S1-based scrambling code is defined, and scrambling is performed in S2. At this time, the code of the SSS is exchanged in 5 ms units, but the PSS-based scrambling code is not exchanged. The PSS-based scrambling code is defined as 6 circular shifts version according to the PSS index in the m-sequence which is generated from the polynomial of $x^5+x^3+1$, and S1-based scrambling code is defined as 8 circular shifts version according to the index of S1 in the m-sequence which is generated from the polynomial of $x^5+x^4+x^2+x^1+1$.

The present specification suggests a new type carrier. In such a new type carrier, out-of-synch may occur. Hereinafter, criteria for determining out-of-synch in 3GPP LTE system are explained.

Generally, the UE may monitor the downlink quality based on the cell-specific reference signal in order to measure the downlink wireless link quality which is received in the primary cell (P-cell). More specifically, the criteria for determining the out-of-synch are related with the block error rate of the PDCCH. However, PDCCH is the shared channel, and thus it may be difficult to calculate the accurate block error rate. As such, a virtual PDCCH block error rate may be estimated based on the downlink quality (e.g., SNR) which has been monitored based on the cell-specific reference signal, and then the out-of-synch may be determined based thereon.

Recently, there was a discussion on the new carrier type (NCT) for efficient communication between the UE and the base station. That is, there was a suggestion to enhance communication efficiency between the UE and the base station by using a new type carrier. The present specification suggests a new type carrier, suggests a plurality of operation schemes related to such a carrier, and suggests a method and apparatus to which a plurality of operation schemes are applied.

The carrier, which is suggested in the present specification, may reduce the overhead of the control channel. Specifically, the overhead according to the reference signal (RS) may be reduced at the time of carrier aggregation (CA). Specifically, the cell-specific reference signal (CRS), which is used in the existing 3GPP LTE release 8 system, is included in all subframes. That is, the CRS is always included in the subframe which is transmitted in 1 ms units, and thus the overhead according to the RS increases and there was high power consumption for RS transmission.

The scheme, which is suggested in the present specification, uses a new type carrier. The carrier according to the present specification has several good characteristics.

First, the carrier according to the present specification may support carrier aggregation (CA) and always operate as the secondary cell. That is, it is possible for the carrier to be set not to operate as the primary cell, but to operate as the secondary cell. In this case, the UE may not perform the random access (RA) to the cell (i.e., the cell corresponding to the carrier according to the present specification), but may perform the random access to the primary cell which is allocated to the UE.

Second, the CRS is included even in the carrier according to the present specification, but the CRS may not be included in all subframes. That is, the CRS may be included in only some of all the subframes. In this case, the CRS may be periodically included. For example, when the subframe is configured in 1 ms units, the CRS may be included in 5 ms periods (i.e., only one CRS is included for every 5 subframes) or in 10 ms periods.

Third, the carrier according to the present specification may not transmit PDCCH. As was described with reference to FIG. 4, etc., in the existing carrier, 1, 2, or 3 symbols have been used for PDCCH transmission within one subframe. However, the carrier according to the present specification may not transmit PDCCH. Instead, it may be possible to use enhanced PDCCH (e-PDCCH). That is, the information, which has been transmitted through the existing PDCCH, is transmitted through PDSCH region, and the e-PDCCH, which is demodulated in the UE RS (e.g., demodulation RS), may be used in the carrier according to the present specification.

A new type carrier, which is used in the present specification, may have the whole or only some of a plurality of features which are described above.

The carrier, which is used in the present specification, may be divided into two types, depending on whether the synchronization signals, i.e., the primary synchronization signal and the secondary synchronization signal, are included. Specifically, the carrier (or the cell corresponding to the carrier) may be divided into a synchronized carrier and a non-synchronized carrier.

In the non-synchronized carrier, both PSS and SSS may be transmitted as in the existing carrier. As such, the synchronized does not include the PSS and SSS, thereby further reducing the overhead. The UE, which operates in the synchronized carrier, may have a problem in maintaining the synchronization because there may be no synchronization signal in the synchronized carrier. However, the UE may maintain synchronization by using an adjacent carrier having a similar channel characteristic from among non-synchronized carriers. That is, if it is possible to assume that the adjacent non-synchronized carrier has a similar channel state with the synchronized carrier, when the synchronization is maintained by using only the non-synchronized carrier, it is possible to consider that the synchronization is maintained even for the synchronized carrier.

Figure 11:
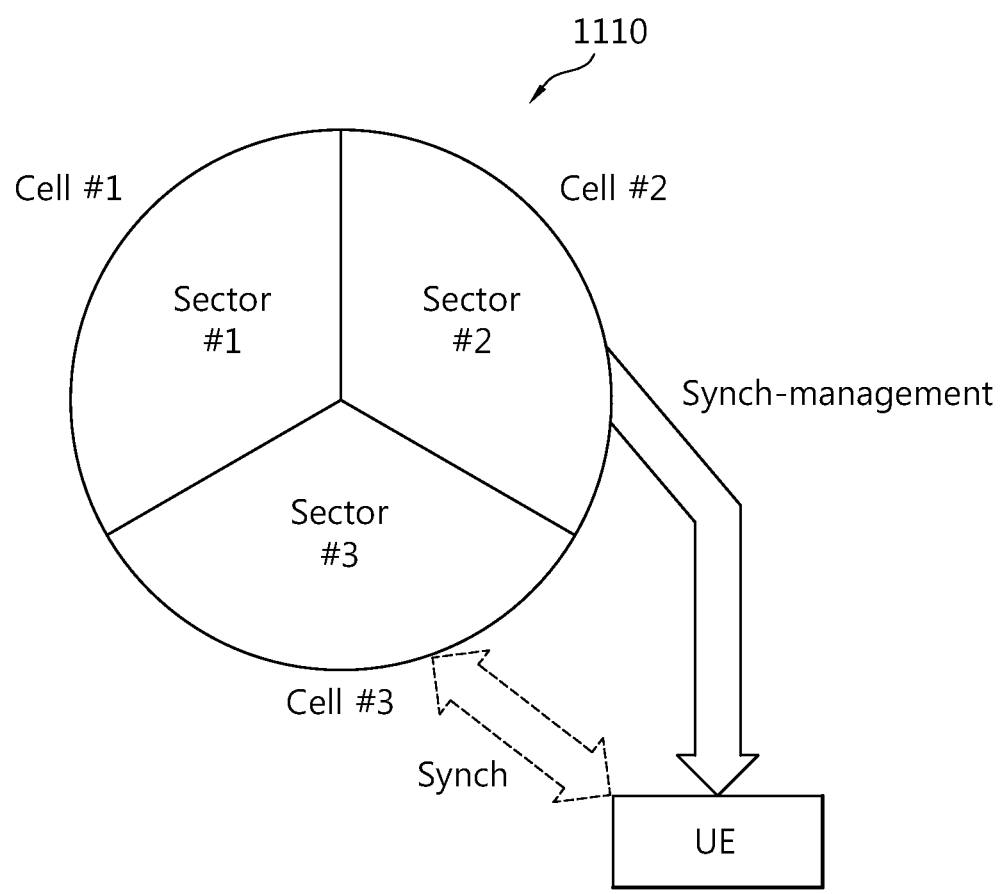
FIG. 11 shows a concept of maintaining synchronization through another cell in an adjacent cell.

FIG. 11 shows a concept of maintaining synchronization through another cell in an adjacent cell.

As illustrated, for example, in a situation when three sectors are included in one base station 1110, there are three cells corresponding to the three sectors, and the cells are placed physically adjacent to each other, when cell #2 corresponds to the non-synchronized carrier and cell #3 corresponds to the synchronized carrier, if the UE is synch-managed by cell #2, it may be considered that the UE maintains synchronization with cell #3.

That is, the UE, which is operated in the synchronized carrier, may maintain synchronization through the non-synchronized carrier having a channel characteristic similar to that of the synchronized carrier. In other words, the non-synchronized carrier may be used as the synchronization reference carrier.

According to a plurality of studies, when cells within the range which does not exceed 20 MHz band are utilized, it is possible to maintain synchronization for the synchronized carrier by using an adjacent carrier from among non-synchronized carriers while performing carrier aggregation (CA) for each cell (i.e., each carrier).

Hereinafter, for the convenience of explanation, the synchronized carrier is called a first type carrier, and the synchronization reference carrier is called a second type carrier. The first type carrier is a carrier which may include at least one of a plurality of new characteristics for reducing the overhead (e.g., a synchronization signal is not included), and the second type carrier is a kind of a non-synchronized carrier including a synchronization signal and may refer to an adjacent carrier having similar characteristics as those of the first type carrier.

In the present specification, frequency aggregation (CA) may be performed by using the first type carrier and the second type carrier having similar characteristics as those of the first type carrier. In this case, the first type carrier and/or the second type carrier may have all of the above-explained characteristics, but may have only some of the characteristics. For example, it may be set for the first type carrier not to include PDCCH and for only some of the subframes to include CRS, and it may be set for the second type carrier to include PDCCH and for all subframes to include CRS. Further, for example, both the first type carrier and the second type carrier may be set to operate as secondary cells (S-cell). That is, both the first type carrier and the second type carrier may be set as secondary cells (S-cell). Further, for example, the first type carrier may be the secondary cell, but the second type carrier may be the primary cell (P-cell). That is, the first type carrier and/or the second type carrier may include the whole or some of the characteristics of the above-described new type carrier.

First Scheme—Radio Resource Management (RRM).

The present specification presents a scheme of performing radio resource management (RRM) by using the above-described carriers.

When carrier aggregation (CA) is supported, each carrier (i.e., corresponding cell) schedules the PDSCH/PUSCH of its own carrier through the PDCCH or schedules the PDSCH/PUSCH of another carrier. In order for the carrier to be added as the secondary carrier/cell according to the frequency combination, the UE needs to perform adjacent neighbor cell measurement.

Generally, information on the cell which needs to be measured by the UE is listed and is provided from the base station. Specifically, the primary cell of the UE may specify what the secondary cell, which may be provided to a specific UE, is, by using information on adjacent cells. In this case, the primary cell may perform measurement by providing the list to the UE.

Generally, the neighbor cell measurement is performed in a form of radio resource management which uses a cell specific reference signal (CRS). In this case, at least one of the synchronized carrier and the non-synchronized carrier may be used according to various schemes as described below in method A-1 to method A-5. As described above, the synchronized carrier assumes a carrier other than the synchronized carrier itself as a synchronization reference. Further, the non-synchronized carrier assumes the non-synchronized carrier itself as the synchronization reference. That is, as described above, the non-synchronized carrier may transmit a signal (e.g., PSS/SSS) which is needed for synchronization so as to secure synchronization. However, the synchronized carrier is preferably not requested to transmit the signal which is needed for synchronization.

That is, the synchronization signal may not be included in the first type carrier (i.e., the synchronized carrier). Instead, as illustrated in FIG. 11, when the adjacent second type carrier has similar characteristics, the synchronization is maintained with reference to the second type carrier. Specifically, the adjacent cell of the same frequency band having similar propagation characteristics and channel characteristics may be set as the synchronization reference. That is, the adjacent cell may operate as the reference cell. Further, the synchronization of the first type carrier (i.e., synchronized carrier) may be referenced by using the reference cell.

In this case, the UE may perform the synchronization tracking for the first type carrier (i.e., the synchronized carrier) by receiving the signal of the second type carrier (i.e., the synchronization reference carrier) during a specific time zone (e.g., a specific subframe having a specific period) on the first type carrier (i.e., the synchronized carrier). In other words, the adjacent carrier may be considered as the synchronization reference carrier, thereby performing the synchronization tracking. During the time zone corresponding the synchronization tracking, the UE may be set to stop a series of operations related to the reception of the downlink data/signal on the first type carrier (i.e., synchronized carrier).

Further, the UE, which operates in the first type carrier (i.e., synchronized carrier), may use the second type carrier (i.e., the synchronization reference carrier) not only for the maintenance of synchronization, but also RRM. That is, RRM may also be performed by using the second type carrier which is considered as the synchronization reference carrier. In other words, with reference to the synchronization reference carrier/cell, not only synchronization may be maintained, but also RRM (reference signal received power (RSRP), reference signal received quality (RSRQ), path loss measurement) may be performed. The details of the synchronization and RRM scheme for the first type carrier (i.e., synchronized carrier) and the second type carrier (i.e., synchronization reference carrier) will be described below.

Method A-1: The UE, which operates in the synchronized carrier, maintains synchronization by using the second type carrier (i.e., synchronization reference carrier) and performs RRM (RSRP, RSRQ, path loss) measurement. That is, according to method A-1, the UE, which operates in the first type carrier, uses the second type carrier for RRM measurement as well as synchronization maintenance. When RRM is measured, the channel state information reference signal (CSI-RS) or cell specific reference signal (CRS), which is included in the second type carrier, may be used.

Method A-2: The UE, which operates in the first type carrier (i.e., synchronized carrier), maintains synchronization by using the synchronization reference carrier. However, RRM (RSRP, RSRQ, path loss) measurement is performed by using CSI-RS or CRS of the first type carrier itself. Method A-2 uses the CSI-RS or CRS which is included in the first type carrier for RRM unlike method A-1. As described above, the first type carrier may also include CRS, but CRS is preferably included in only some of all the subframes.

Method A-3: The UE, which operates in the first type carrier (i.e., the synchronized carrier) performs RRM (RSRP, RSRQ, path loss) measurement while maintaining synchronization by using the second type carrier (synchronization reference carrier). Further, the RRM (RSRP, RSRQ, path loss) measurement is performed by using CSI-RS or CRS of the first type carrier itself.

Method A-4: The UE, which operates in the first type carrier, maintains the synchronization by using the second type carrier (synchronization reference carrier), performs RSRP or path loss measurement while performing the RRM measurement, and performs RSRQ measurement or path loss measurement by using CSI-RS or CRS of the first type carrier itself.

Specifically, according to method A-4, RSRP uses the second type carrier. However, RSRQ may be indicated by the value which is obtained by dividing the RSRP for its own cell by the interference, and thus according to method A-4, when obtaining RSRP, the second type carrier is used, and when obtaining RSRQ, RSRQ, which is measured by using the first type carrier, and the interference, which is measured by using the first type carrier, may be used.

Method A-5: The UE, which operates in the first type carrier (i.e., synchronized carrier), may maintain the synchronization by using the second type carrier (synchronization reference carrier) and perform RSRP measurement by using the reference signal (e.g., CRS or CSI-RS) which is transmitted from the second type carrier. Further, the interference measurement may be performed by using the signal (e.g., CSI-RS or CRS) which is transmitted from its own carrier (i.e., the first type carrier), and the measured value may be used in the RSRQ measurement. That is, in order to calculate the RSRQ, the value, which is measured in different carriers, is used. In this case, the path loss measurement may be performed by using the signal which is transmitted from the second type carrier and may be performed by using the signal which is transmitted from its own carrier (i.e., the first type carrier).

According to method A-5, RSRP is measured by using the second type carrier which is used for the maintenance of synchronization. Further, the RSRP, which is measured by using the second type carrier, is used in calculating the RSRQ value. However, the interference measurement, which is needed to obtain the RSRQ value, is performed by using the first type carrier.

In the case of RSRP measurement, a close value may also be obtained by using a cell (i.e., the second type carrier) other than its own cell. However, in the case of the RSRQ which is much influenced by the interference, it may be more advantageous to use the CSI-RS or CRS of its own cell (i.e., the first type carrier). As such, method A-5 measures the RSRP by using the second type carrier and measures interference by using the first type carrier. Further, the RSRQ is measured by using the measured RSRP and interference.

In order to perform the RRM-related measurement, the acquisition/synchronization of the cell, which is the subject of measurement, needs to be obtained. As such, the reference cell of the synchronized carrier may be selected from cells for which the UE performs measurement. Reversely, the UE performs measurement for the cell which is indicated as the reference cell of the synchronized carrier. That is, when performing the carrier aggregation (CA), the list of the cell/carrier, which becomes the subject of measurement in the primary cell (P-cell), is provided to the UE, and the UE performs measurement therefor. Further, the primary cell may indicate which carrier corresponds to the first type carrier from among a plurality of carriers included in the list and which carrier corresponds to the second type carrier.

As such, the measurement of the first type carrier (i.e., the synchronized carrier) may be performed for the cell (i.e., the second type carrier) which becomes the synchronization reference. The above described methods A-1 to A-5 may be used for a more specific method.

Second Scheme—Scheme of Aggregating the Carrier as the Secondary Cell (S-Cell).

The present specification suggests a scheme of aggregating a new type carrier (i.e., the above-described first type carrier) as the secondary cell (S-cell).

In order for the first type carrier (i.e., the synchronized carrier) to be aggregated as the secondary cell, the UE needs to measure the carrier. However, the first type carrier (i.e., the synchronized carrier) may not transmit the synchronized signal (SS), and thus direct measurement on the first type carrier may not be performed.

Hence, it is possible to determine whether to be aggregated as the secondary cell (S-cell) by measuring the second type carrier (i.e., the synchronization reference carrier) instead of the first type carrier). In this case, the base station may determine whether to configure or activate the first type carrier (i.e., the synchronized carrier) as the S-cell according to the result of measurement for the second type carrier of the UE. A specific scheme is as follows.

Method B-1: This is a method of independently configuring/activating the firs type carrier (i.e., synchronized carrier). That is, this is a method of determining whether to configure or activate the first type carrier as S-Cell regardless of the result of measurement for the second type carrier.

Method B-2: However, when following method B-2, the first type carrier (i.e., synchronized carrier) is simultaneously configured with the second type carrier (i.e., synchronization reference carrier). That is, when the second type carrier is configured as S-cell, the first type carrier may also be configured as S-cell regardless of separate additional judgment or measurement. Of course, unlike method B-2, when the second type carrier is set, it is possible to set only the second type carrier as the S-Cell.

Method B-2-1: Even if the configuration is performed simultaneously, being activated as the S-cell may be independently performed. According to method B-2-1, the first type carrier (i.e., synchronized carrier) and the second type carrier (i.e., synchronization reference carrier) may be independently activated.

Method B-2-2: When configuration is simultaneously performed, being activated as S-cell may also be simultaneously performed. That is, according to method B-2-2, the first type carrier (i.e., synchronized carrier) and the second type carrier (i.e., synchronization reference carrier) may be always simultaneously activated. In other words, when the second type carrier is activated as S-cell, the first type carrier may also be activated as S-cell without additional measurement/judgment.

Further, when setting or activating the first type carrier (i.e., synchronized carrier), the fact that the carrier is the synchronized carrier may be notified to the UE. Further, when directing the performance of measurement on the carrier, the information on the synchronized carrier may also be transmitted together. That is, if the carrier/cell, which becomes the subject of measurement, is notified as a list by the UE in the P-cell and the result of measurement is reported, the information on the carrier/cell, which is set/activated as S-cell, may be directed to the UE by using the result of measurement in P-cell. In this process, the fact that a specific carrier/cell is the synchronized carrier may be notified to the UE.

Further, the above-described methods B-1, B-2, B-2-1, B-2-2, etc. may be performed after performing the methods A-1 to A-5. That is, the measurement on the first type carrier (i.e., synchronized carrier) is performed according to methods A-1 to A-5, and methods B-1, B-2, B-2-1, and B-2-2 may be used by using the result of the measurement.

As described above, the first type carrier may be set only as S-cell, and the second type carrier may be set also as the P-cell as well as S-cell. However, the second scheme is about configuration/activation as S-cell, and thus it is assumed here that the second type carrier is set only as S-cell.

Third Scheme—Setting of Cyclic Shift

The specification provides an example of setting the length of the cyclic shift (cyclic prefix) which is applied to the above-described carriers.

Specifically, in the case where the first type carrier (i.e., the synchronized carrier) and the adjacent second type carrier (i.e., the synchronization reference carrier) are configured together, if the CP length of the second type carrier becomes larger than the CP length of the first type carrier, even though the timing synchronization is obtained for the second type carrier, it may be a problem that it cannot be certain that the timing synchronization has been obtained for the second type carrier. That is, the size of the delay, which may be allowed according to the CP length, and in a situation where the synchronization is maintained as the UE, which operates in the first type carrier, uses the second type carrier, if the CP length for the second type carrier is set larger, even though the synchronization has been obtained on the basis of the second type carrier, it cannot be certain that the synchronization has been obtained for the first type carrier.

Hence, the third scheme suggests the CP length of the first type carrier to be set to be the same as or larger than the CP length of the second type carrier. Specifically, a normal CP may be applied to the first type carrier (i.e., the synchronized carrier), and a normal CP may be applied to the second type carrier (i.e., synchronization reference carrier). As another example, an extended CP may be applied to the first type carrier (i.e., synchronized carrier) and a normal CP may be applied to the second type carrier (i.e., synchronization reference carrier). As another example, an extended CP may be applied to the first type carrier (i.e., synchronized carrier) and an extended CP may be applied to the second type carrier (i.e., synchronization reference carrier).

The CP length may be set by the upper layer signaling (e.g., RRC signaling). Further, the third scheme may be applied to the first scheme and/or the second scheme. That is, the CP length, which is used in a situation where the RRM measurement is performed or S-cell is configured/activated, may be used as suggested in the third scheme.

Fourth Scheme—Granting of Cell ID

When operated in the above-described first to third schemes, the physical cell ID, which has been identified as the existing PSS and SSS, is not granted. The fourth scheme suggests a scheme which is related to the cell ID.

Specifically, when the second type carrier (i.e., synchronization reference carrier) and the first type carrier (i.e., synchronized carrier) are set together and are activated, PSS and SSS may not be included in the synchronized carrier, and thus an independent cell ID (cell ID) may not be granted to the UE. As such, the problem of cell deployment, which may occur due to the lack of the cell ID, may be resolved.

However, the cell ID is used in various formulas, and thus in order to use the carrier without PSS/SSS, it needs to be considered on how the existing formula is to be processed. According to the fourth scheme, the scrambling sequence of PDSCH/DM-RS/CSI-RS may be initialized with the same value as the second type carrier (i.e., synchronization reference carrier) and the first type carrier (i.e., synchronized carrier) use the same parameter, and may be initialized according to a specific embodiment as described below.

Specifically, for the initialization of the scrambling sequence of PDSCH of the first type carrier (synchronized carrier), the scrambling sequence initialization of PDSCH corresponding to the qth codeword may be expressed as follows.

$$n_{RNTI} \cdot 2^{13} + q \cdot 2^{13} + \lfloor n_s/2 \rfloor \cdot 2^9 + A \text{ for PDSCH} \quad \text{[Formula 3]}$$

Here, n_rnti is UE ID, and q is the slot index.

Further, A value may be the value corresponding to the cell id of the second type carrier (synchronization reference carrier), the value corresponding to the P-Cell ID, or the value which is determined by higher layer signaling (e.g., RRC signaling) which substitutes the cell ID. That is, the fourth scheme provides a scheme of determining A value in the above formula 3.

The scheme related with the above formula 3 may also be applied to formula 4 below.

$$(\lfloor n_s/2 \rfloor + 1) \cdot (B+1) \cdot 2^{16} + n_{SCID} \quad \text{[Formula 4]}$$

Formula 4 is for initialization of the scrambling sequence of DM RS.

Here, B value may be the value corresponding to the cell id of the second type carrier (synchronization reference carrier), the value corresponding to the P-Cell ID, or the value which is determined by the high layer signaling (e.g., RRC signaling) which substitutes the cell ID. It may preferably be the value corresponding to the P-cell ID. That is, the fourth scheme provides a scheme of determining B value in the formula 4.

The scheme related to the formulas 3 and 4 may also be applied in formula 5.

$$2^{10} \cdot (7 \cdot (n_s+1) + l + 1) \cdot (2 \cdot C+1) + 2 \cdot C + N_{CP} \quad \text{[Formula 5]}$$

The formula 5 is for initialization of the scrambling sequence of CSI RS.

In the formula 5, C value may be the value corresponding to the cell id of the second type carrier (synchronization reference carrier), the value corresponding to the P-cell ID, or the value which is determined by higher layer signaling (e.g., RRC signaling) which substitutes the cell ID. That is, the fourth scheme provides a scheme of determining C value in the equation 5.

Fifth Scheme—Out-of-Synch Monitoring

The fifth scheme suggests a scheme of performing out-of-synch monitoring when the first type carrier is used.

Generally, when the state becomes the out-of-synch state in which synchronization of the P-cell is not maintained according to radio link monitoring (RLM) scheme, the deactivation is performed for the related S-cell.

When the first type carrier (i.e., synchronized carrier) is independently set and is activated or is set along with the second type carrier and is activated, the first type carrier (i.e., synchronized carrier) may operate as S-cell. In this case, the out-of-synch monitoring may follow P-Cell. That is, when P-cell is out-of-synch by performing out-of-synch monitoring only for P-cell, it can be considered that all S-cells are out-of-synch.

In addition, the deactivation may be performed according to the result of measurement of the second type carrier (i.e., synchronization reference carrier) which is related to the first type carrier (i.e., synchronized carrier) which is activated as S-cell. That is, if the adjacent second type carrier is deactivated, the deactivation for the first type carrier may be promptly performed without additional measurement or judgment. Of course, it is possible to perform independent deactivation for the first type carrier by independently performing measurement for the first type carrier.

Further, a specific method of determining the out-of-synch for a specific carrier may be as follows. Generally, when the legacy PDCCH is included, the out-of-synch needs to be determined by using the block error rate of the PDCCH, but because PDCCH is a channel which a plurality of UEs share, and thus the scheme of measuring the SNR of the CRS, which is included in the PDCCH, and estimating the block error rate based on the measured value has been widely utilized. However, the carrier used in the present specification is different from a general carrier in terms of the structure, and thus a scheme, which is different from the existing scheme which has used the legacy PDCCH, is suggested.

Method C-1: Method C-1 may be used when, not the legacy PDCCH, but the above-described e-PDCCH is used. Specifically, after measuring the downlink radio link quality is measured by using CSI-RS, the out-of-synch may be determined by mapping the measured value with the hypothetical error rate of the e-PDCCH. For example, a mapping curve, which shows the SNR value, which is obtained by using the CSI-RS, and the hypothetical error rate of the e-PDCCH, is made, and the occurrence of the out-of-synch is determined by using the mapping curve. Method C-1 may be useful when the legacy PDCCH is not transmitted.

Method C-2: Method C-2 may be used in the carrier having the existing structure. That is, when the legacy PDCCH is included, the CSI-RS, which is included in the PDCCH, may be measured, and thereby the occurrence of the out-of-synch may be determined in a manner that maps the hypothetical error rate of the PDCCH. Method C-2 may estimate the virtual error ate of the PDCCH even if the carrier, in which the CRS is not included, is used.

Method C-3: Method C-3 may be used when, not the legacy PDCCH, but the above-described e-PDCCH is used. As described above, the DM RS is included in the e-PDCCH for demodulation, and by measuring the DM RS, the occurrence of the out-of-synch may be determined in a manner that maps the hypothetical error rate of the e-PDCCH and the measured value. Method C-3 has a problem that the hypothetical error rate cannot be accurately estimated when the transmission frequency of the DM RS is low.

Method C-4: Method C-4 may be used when, not the legacy PDCCH, but the above described e-PDCCH is used. The CRS is not included in all subframes, but may be included in a certain period (e.g., 5 ms). In this case, after measuring the downlink radio link by using CRS, the occurrence of the out-of-synch may be determined in a manner that maps the hypothetical error rate of the e-PDCCH with the measured value. For example, a mapping curve, which shows the SNR value, which is obtained by using the CRS which is included in only some frames, and the hypothetical error rate of the e-PDCCH, is prepared in advance, and the occurrence of the out-of-synch may be determined by utilizing the mapping curve.

The fifth scheme may be preferably used along with at least one of the first to fourth schemes. For example, the carrier, in which the RRM is performed according to the first scheme and the carrier has been configured and activated according to the second scheme, may be deactivated according to the fifth scheme. Further, the carrier according to the third and/or fourth scheme may be deactivated according to the fifth scheme.

Figure 12:
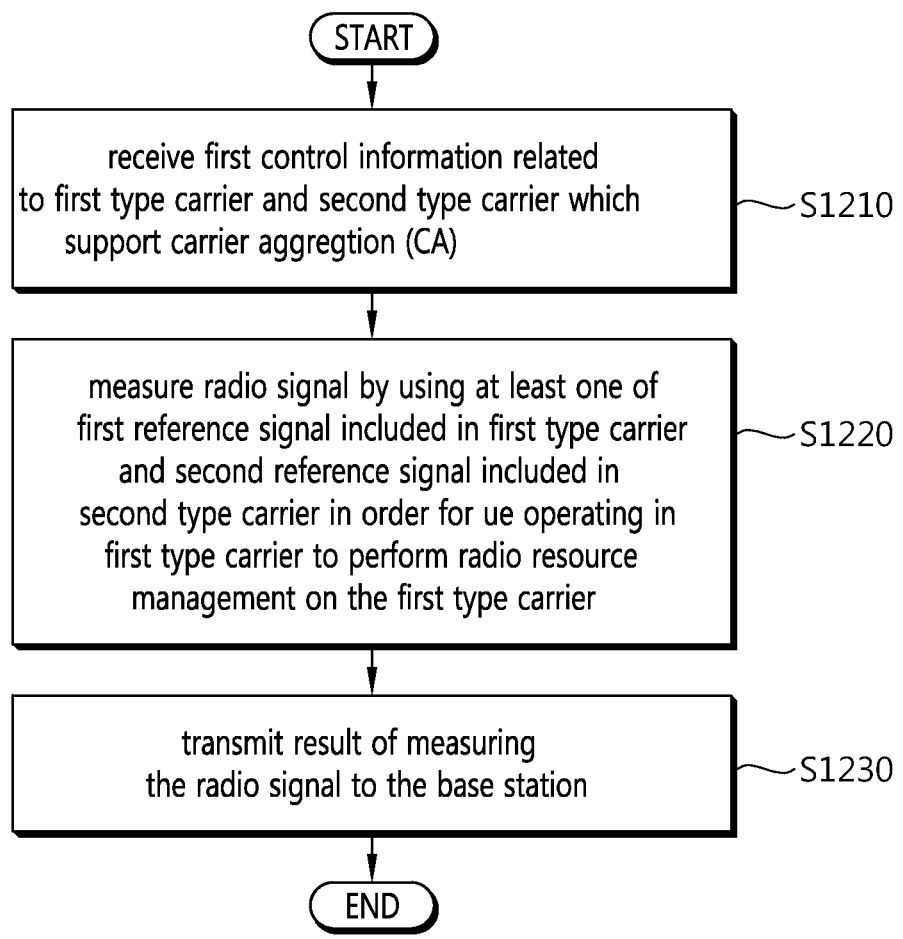
FIG. 12 shows a procedure flow according to the present embodiment.

FIG. 12 shows a procedure flow according to the present embodiment.

An example of FIG. 12 may be applied in a radio communication system which supports carrier aggregation and performs communication in subframe units. The subframe may be preferably transmitted in a certain period such as 1 ms.

At least the first type carrier and the second carrier are used as the carrier which is related to the carrier aggregation (CA).

The first type carrier may be the above-described synchronized carrier. Further, the second type carrier may be the synchronization reference carrier having channel characteristics similar to those of the first type carrier. Specifically, the synchronization signal is not included in the first type carrier, and the UE, which operates in the first type carrier, may maintain synchronization for the first type carrier by using the synchronization signal which is included in the second type carrier. Further, a cell specific reference signal (CRS) may be included in only some of all the subframes in the first type carrier. Further, the physical downlink control channel (PDCCH) may not be included in the first type carrier, and the PDCCH and the cell specific reference signal (CRS) may be included in all subframes in the second type carrier.

As in operation S1210, the control information, which is related to the first type carrier and the second type carrier, may be received from the base station. The control information may direct the UE to measure the wireless signal for a specific carrier.

After the control information is received from the base station, as in operation S1220, the UE, which operates in the first type carrier, may measure the radio signal by using at least one of the first reference signal which is included in the first type carrier, and the second reference signal which is included in the second type carrier in order to perform radio resource management (RRM) for the first type carrier. The first reference signal may be at least one of the channel state information reference signal (CSI-RS) and the cell specific reference signal (CRS) which are related to the first type carrier, and the second reference signal may be at least one of the channel state information reference signal (CSI-RS) and the cell specific reference signal (CRS) which are related to the second type carrier.

The illustrated operation S1220 may be performed according to one of the above described methods A-1 to A-5.

After the performance of operation S1220, the UE may transmit the result of measuring the radio signal to the base station as illustrated in operation S1230.

After operation S1230, the base station may configure/activate the carrier according to the above-described scheme 2. Further, in the example of FIG. 12, the cyclic shift may be determined according to the above-described scheme 3. Further, in the example of FIG. 12, the cell identifier may be provided according to the above-described scheme 4. Further, after the example of FIG. 12 is performed and the carrier is configured/activated according to the above-described scheme 2, the carrier may be deactivated according to the above-described scheme 5.

Figure 13:
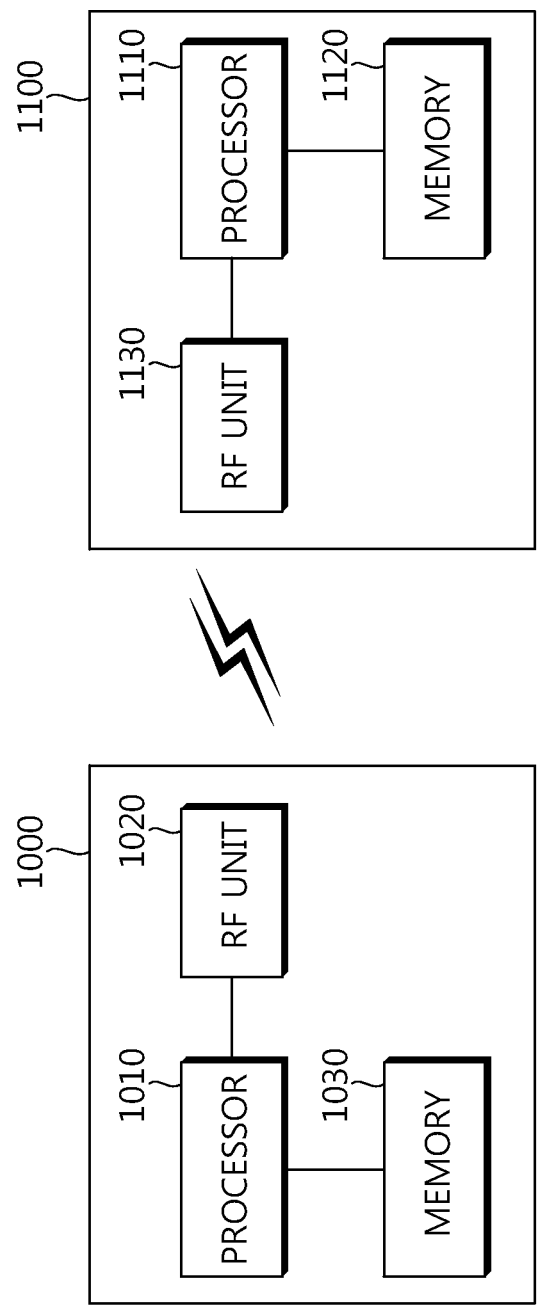
FIG. 13 shows a transmission apparatus to which the scheme according to the present specification is applied.

FIG. 13 shows a transmission apparatus to which the scheme according to the present specification is applied.

In the above described scheme, a UE 1000 may be implemented as the device which transmits the control information through the uplink. The UE 1000 may communicate with the base station 1100.

The UE 1000 includes a processor 1010, a memory 1030, and a radio frequency (RF) unit 1020. The processor 101 may allocate radio resources according to the externally provided information and information which is stored inside. The procedure, scheme, and function, which are performed by the UE from among the above-described embodiments, may be implemented by the processor 1010. The memory 1030 is connected to the processor 1010 and stores various information for operating the processor 1010. The RF unit 1020 is connected to the processor 1010 and transmits and/or receives radio signals.

The base station 1100, which communicates with the UE, includes a processor 1110, a memory 1120, and an RF unit 1130. The procedure, scheme, and function, which are performed by the base station from among the above described embodiments, may be implemented by the processor 1110. A memory 1120 is connected to a processor and stores various information for operating the processor 1110. A RF unit 1130 is connected to the processor 1110 and transmits and/or receives radio signals.

The processors 1010 and 1110 may include an application-specific integrated circuit (ASIC), another chipset, and/or a logical circuit and/or data processing device. The memories 1020 and 1120 may include a read-only memory (ROM), a random access memory (RAM), a flash memory, a memory card, a storage medium and/or other storage devices. The RF units 1030 and 1130 may include a baseband circuit for processing radio signals. When embodiments are implemented as software, the above-described schemes may be implemented as a module (process, function, etc.) for performing the above-described functions. The module is stored in memories 1020 and 1120, and may be executed by processors 1010 and 1110. The memories 1020 and 1120 may exist inside or outside the processors 1010 and 1110, and may be connected to the processors 1010 and 1110 in various well-known means.

The above-described methods and devices may be implemented by hardware, software, or a combination thereof. In the hardware implementation, they may be implemented by an application specific integrated circuit (ASIC), a digital signal processing (DSP), a programmable logic device (PLD), a field programmable gate array (FPGA), a processor, a controller, a micro-processor, another electronic unit, or a combination thereof. In the software implementation, they may be implemented as a module for performing the above-described functions. The software may be stored in a memory unit and is executed by the processor. The memory unit or processor may adopt various means which are known to those skilled in the art.

What is claimed is:

1. A method of performing communication between a user equipment (UE) and a base station in a radio communication system which supports carrier aggregation and performs communication in subframe units, the method comprising:

receiving, from a base station, first control information which supports the carrier aggregation and is related to a first type carrier and a second type carrier;

measuring a radio signal by using at least one of a first reference signal included in the first type carrier and a second reference signal included in the second type carrier in order for the UE which operates in the first type carrier to perform radio resource management for the first type carrier; and transmitting a result of measuring the radio signal to the base station, wherein the first type carrier does not contain a synchronization signal, wherein the UE, which operates in the first type carrier, maintains synchronization for the first type carrier by using a synchronization signal included in the second type carrier, wherein the first reference signal is at least one of a channel state information reference signal (CSI-RS) and a cell specific reference signal (CRS) which are related to the first type carrier, wherein the second reference signal is at least one of a channel state information reference signal (CSI-RS) and a cell specific reference signal (CRS) which are related to the second type carrier, and wherein a cell specific reference signal (CRS) is included in only some of all subframes in the first type carrier.

2. The method of claim 1, wherein the first type carrier is a synchronized carrier, and the second type carrier is a synchronization reference carrier,
- wherein the synchronization signal includes a primary synchronization signal (PSS) and a secondary synchronization signal (SSS),
- wherein a physical downlink control channel (PDCCH) is not included in the first type carrier, and
- wherein a PDCCH or an enhanced PDCCH is included in all subframes in the second type carrier.

3. The method of claim 1, wherein the first type carrier is a synchronized carrier, and the second type carrier is a synchronization reference carrier,
- wherein the synchronization signal includes a primary synchronization signal (PSS) and a secondary synchronization signal (SSS),
- wherein the first type carrier does not include a physical downlink control channel (PDCCH), and
- wherein the second type carrier includes the PDCCH and a cell specific reference signal (CRS) in all subframes.

4. The method of claim 1, wherein the UE, which operates in the first type carrier, calculates at least one of a reference signal received power (RSRP), a reference signal received quality (RSRQ), and a path loss by using at least one of the first reference signal and the second reference signal.

5. The method of claim 1, wherein the UE, which operates in the first type carrier, calculates the RSRP by using only the second reference signal, and interference measurement for measuring the RSRQ is calculated by using only the first reference signal.

6. The method of claim 1, further comprising:
- receiving, from the base station, second control information which indicates configuring or activating at least one of the first type carrier and the second type carrier as a secondary cell, wherein the configuration or activation is performed based on the result of measurement.

7. The method of claim 6, wherein, when one of the first type carrier and the second type carrier is configured or activated as a secondary cell, the first type carrier and the second type carrier are simultaneously configured or activated as the secondary cell.

8. The method of claim 5, wherein a length of a cyclic shift (cyclic prefix) which is applied to the first type carrier is set to be the same or longer than the length of the cyclic shift which is applied to the second type carrier.

9. The method of claim 6, further comprising:
- receiving a signal, from the base station, which indicates a primary cell ID as a physical cell ID.

10. The method of claim 6, wherein, after the first type carrier and the second type carrier are activated, if the second type carrier is deactivated, the first type carrier is deactivated simultaneously with the second type carrier.

11. The method of claim 1, further comprising:
- determining whether synchronization of the first type carrier is maintained,
- wherein the first type carrier does not include a physical downlink control channel (PDCCH),
- wherein a downlink radio link quality is measured by using a channel state information reference signal (CSI-RS) which is related to the first type carrier, and it is determined whether synchronization of the first type carrier is maintained according to the measured downlink radio link quality.

* * * * *